US009392254B2

(12) United States Patent  
Barkley

(10) Patent No.: US 9,392,254 B2  
(45) Date of Patent: Jul. 12, 2016

(54) GAME SIZING CAMERA

(71) Applicant: John Clinton Barkley, Burleson, TX (US)

(72) Inventor: John Clinton Barkley, Burleson, TX (US)

( * ) Notice: Subject to any disclaimer, the term of this patent is extended or adjusted under 35 U.S.C. 154(b) by 335 days.

(21) Appl. No.: 14/192,874

(22) Filed: Feb. 28, 2014

(65) Prior Publication Data

US 2015/0247721 A1    Sep. 3, 2015

(51) Int. Cl.
*H04N 13/00* (2006.01)
*G01B 11/02* (2006.01)
*G06K 9/00* (2006.01)

(52) U.S. Cl.
CPC ............ *H04N 13/0051* (2013.01); *G01B 11/02* (2013.01); *H04N 13/0007* (2013.01); *G06K 9/00201* (2013.01); *G06T 2207/10028* (2013.01)

(58) Field of Classification Search
CPC .............. G01S 17/08; H04N 13/0051; H04N 13/0007; G01B 11/02; G01B 11/03; G01B 11/022; G06K 9/00362; G06K 9/00201; G06T 2207/10028; F41G 3/06; F41G 1/38
See application file for complete search history.

(56) References Cited

U.S. PATENT DOCUMENTS

| | | | | |
|---|---|---|---|---|
| 5,616,903 A * | 4/1997 | Springer | ................... | G01C 3/04 235/414 |
| 6,549,289 B1 * | 4/2003 | Ellis | ..................... | A01K 11/006 348/135 |
| 8,483,446 B2 | 7/2013 | Demarais | | |
| 8,998,085 B2 * | 4/2015 | McHale | .................... | F41G 3/06 235/400 |
| 9,104,906 B2 * | 8/2015 | McVey | .................... | G06K 9/52 |
| 2007/0110281 A1 * | 5/2007 | Jurk | ................... | G06F 17/30244 382/110 |
| 2011/0028212 A1 * | 2/2011 | Krien | ................... | A47G 33/004 463/32 |
| 2011/0279650 A1 * | 11/2011 | Liao | ........................ | A01K 29/00 348/46 |
| 2013/0064432 A1 * | 3/2013 | Banhazi | ................ | G06T 7/0083 382/110 |
| 2014/0029808 A1 * | 1/2014 | Lee | .................... | G06K 9/00362 382/110 |
| 2014/0379613 A1 * | 12/2014 | Nishitani | ........... | G06Q 30/0283 705/400 |
| 2015/0043788 A1 * | 2/2015 | Lee | .................... | G06K 9/00362 382/110 |
| 2015/0154453 A1 * | 6/2015 | Wilf | ................... | G06K 9/00711 382/103 |
| 2015/0187091 A1 * | 7/2015 | Hata | ...................... | G01B 11/02 382/101 |
| 2015/0338509 A1 * | 11/2015 | Lange | .................... | G01S 17/36 356/5.01 |
| 2016/0012278 A1 * | 1/2016 | Banhazi | .................. | G06K 9/46 382/110 |

FOREIGN PATENT DOCUMENTS

JP      2013253868 A   * 12/2013

OTHER PUBLICATIONS

Oggier et al.; An all-solid-state optical range camera for 3D real-time imaging with sub-centimeter depth resolution (SwissRanger); Feb. 18, 2004; Optical Design and Engineering, Proc. SPIE, vol. 5249; pp. 534-545.*

* cited by examiner

*Primary Examiner* — John Villecco

(57) ABSTRACT

A game sizing camera which obtains three-dimensional data of wild game. The three-dimensional data is used to directly compute useful dimensional measurements of the wild game. These dimensional measurements can then be overlaid on imagery of the wild game.

11 Claims, 5 Drawing Sheets

GAME SIZING CAMERA

CROSS-REFERENCE TO RELATED APPLICATIONS

Not Applicable

STATEMENT REGARDING FEDERALLY SPONSORED RESEARCH

Not Applicable

REFERENCE TO A SEQUENCE LISTING, A TABLE, OR A COMPUTER PROGRAM LISTING COMPACT DISC APPENDIX

Not Applicable

BACKGROUND OF THE INVENTION

1. Field

This application relates to game cameras. More particularly, this application relates to a device which obtains three-dimensional data of wild game. More particularly, this application relates to a device that, through use of obtained three-dimensional data, displays dimensional measurements of wild game to a user.

2. Prior Art

Presently, most game cameras will detect the movement of wild game, and attempt to take pictures of the wild game for review at a later time. Some advanced game cameras even capture useful information such as the time, date, moon phase, and temperature when the picture was taken. All of this information is useful, but really what a lot of game camera users want to know, is how big the wild game actually is. Presently, all game camera users must make an estimate at the size of the wild game. These estimates can be influenced by factors such as the distance the wild game is from the game camera, the orientation of the wild game with respect to the game camera, and other objects within the scene that may make the wild game seem larger or smaller relative to that object's unknown size. US patent publication U.S. Pat. No. 8,483,446 B2 provided a system for estimating wild game dimensional measurements based upon 2D imagery and assumed feature sizes of the wild game; however, feature sizes of wild game are not always the same size, nor are they always visible for measurement within the 2D image. An estimate based upon assumptions will most likely not be as accurate as a direct measurement.

Accordingly, there is a need in the art for a device which can obtain three-dimensional data of wild game, and then through the use of that three-dimensional data, display dimensional measurements of the wild game to a user. Recent advances in three-dimensional imaging have made such a device practical.

BRIEF SUMMARY OF THE INVENTION

In accordance with one embodiment, the present invention is a device which obtains three-dimensional data of wild game, and then through the use of that three-dimensional data, displays dimensional measurements of the wild game to a user.

DETAILED DESCRIPTION OF THE PREFERRED EMBODIMENT OF THE INVENTION

Figure 1A:
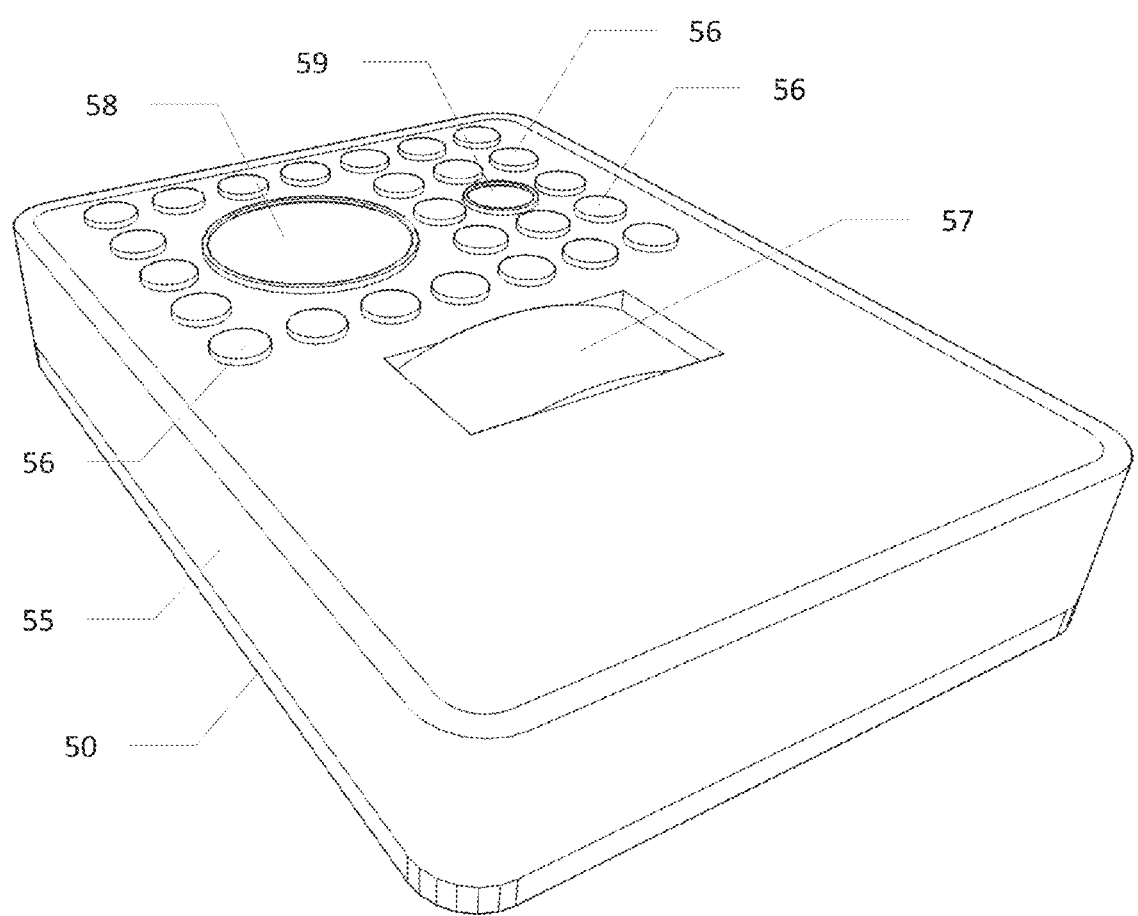
FIG. 1A is a perspective view showing the front side of the preferred embodiment.
Figure 1B:
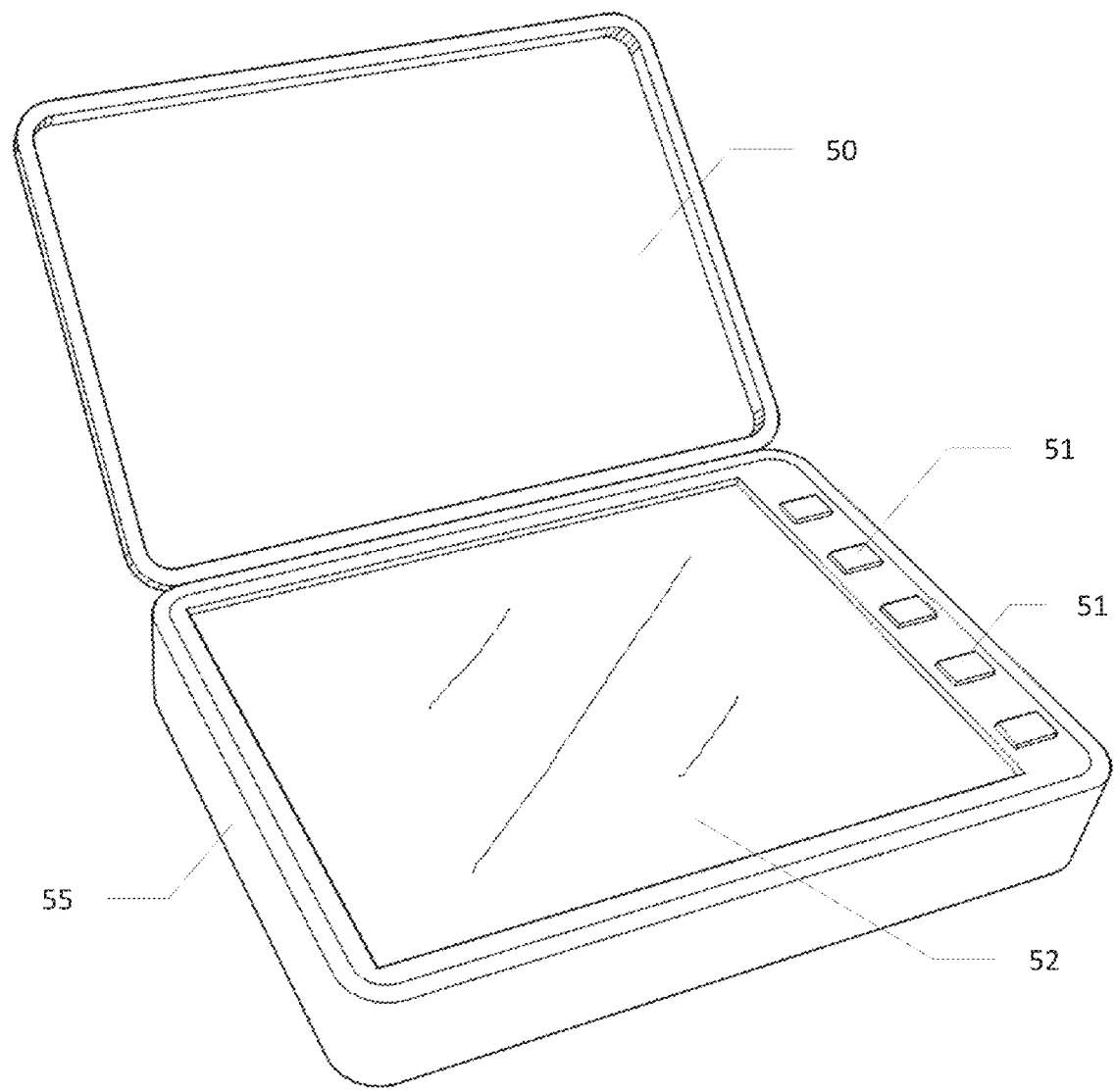
FIG. 1B is a perspective view showing the back side of the preferred embodiment with the rear door open.
Figure 1C:
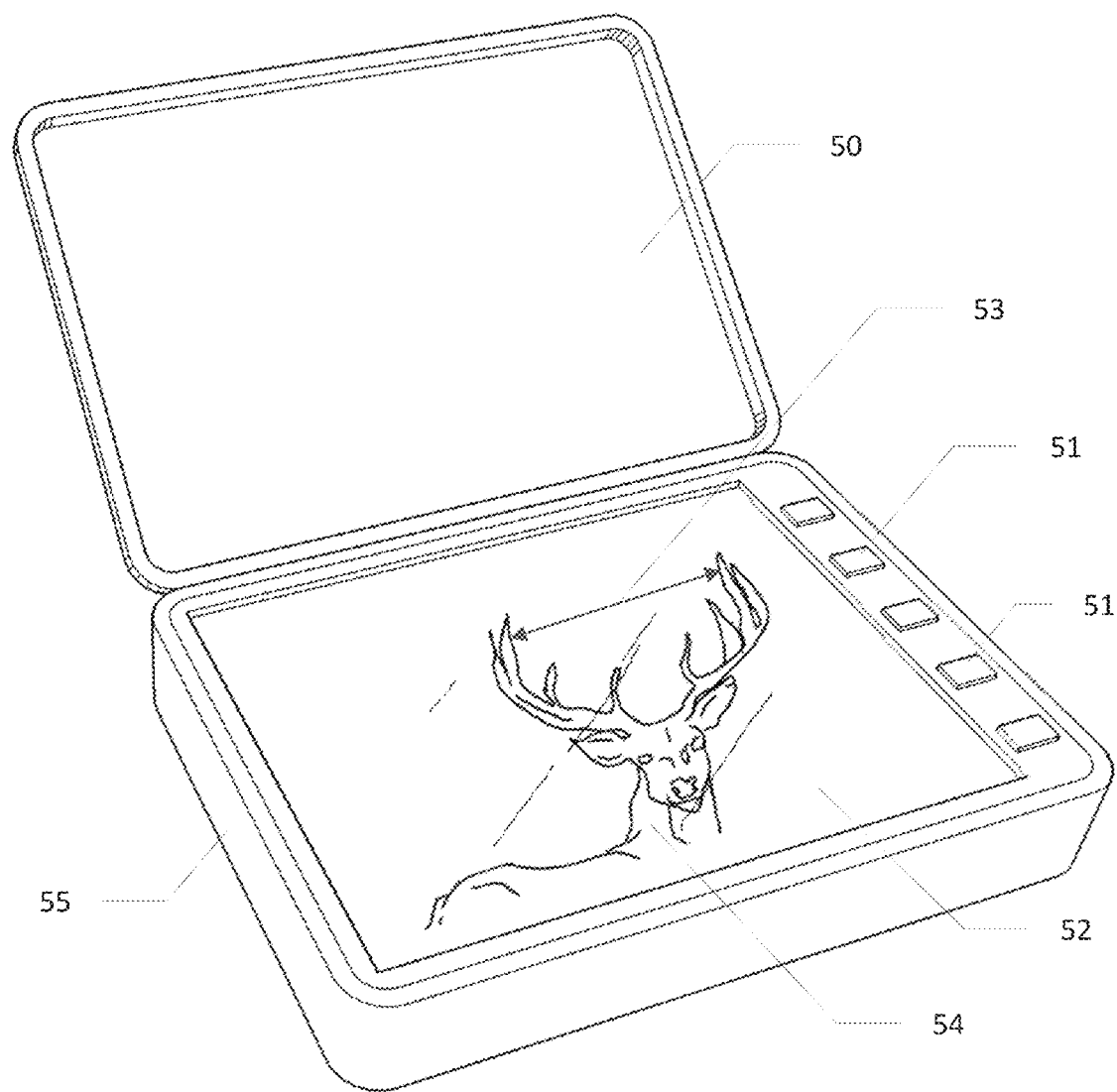
FIG. 1C is a perspective view showing the back side of the preferred embodiment with the rear door open, and an illustrative dimensional measurement displayed.
Figure 2:
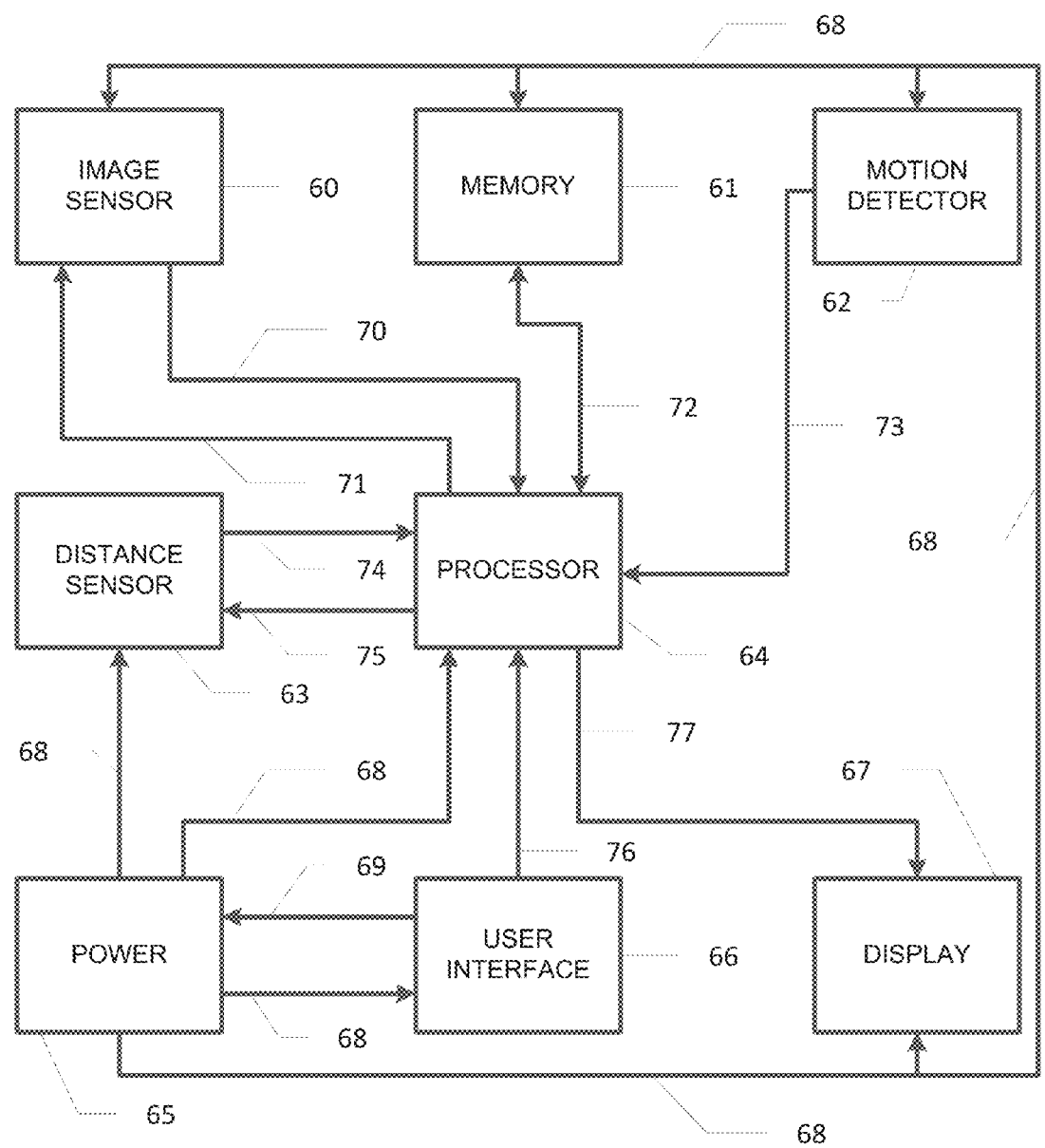
FIG. 2 is a block diagram representing the preferred embodiment's interconnections.

The preferred embodiment of the present invention is shown in FIG. 2 (interconnect diagram), FIG. 1A (front perspective view), FIG. 1B (rear perspective view), and FIG. 1C (rear perspective view with illustrative dimensional measurement). The preferred embodiment of the present invention is comprised of a non-scanning time-of-flight distance sensor 63; a processor 64; an image sensor 60; a removable memory module 61; a motion detector 62; a display 52/67; a user interface 66 comprised of buttons 51 and a touchscreen element 52; a plastic rectangular housing 55; and a rechargeable lithium-ion battery with supporting power regulation circuitry 65. The motion detector 62 detects the presence of wild game 54, and correspondingly provides a trigger 73 to the processor 64. The image sensor 60 receives a trigger 71 from the processor 64, and correspondingly provides visible image data 70 back to the processor 64. The distance sensor 63 receives a trigger 75 from the processor 64, and correspondingly provides a plurality of distance measurements 74 to the processor 64. This plurality of distance measurements 74 typically consists of thousands of distance measurements between the distance sensor 63 and corresponding objects within its field of view, which in this case is wild game 54. The processor 64 uses the received plurality of distance measurements 74 to compute three-dimensional data of wild game 54, and provide user-specified dimensional measurements 53, overlaid on processed images 77, to the display 52/67 and memory module 61. The memory module 61 stores processed data 72 sent from the processor 64, and provides processed data 72 back to the processor 64 upon a user request 76 from the user interface 66. The user interface's 66 buttons 51 and touchscreen element 52 provide various user requests 76 to the processor 64 regarding the generation of three-dimensional data of wild game 54, and the overlay of dimensional measurements 53 on the visible image data 70 shown on the display 52/67 and stored in the memory module 61. The housing 55 surrounds all other components with openings for the display 52/67, buttons 51, image sensor optic 59, motion detector optic 57, and distance sensor optics 56/58. The housing 55 also has a rear door 50 which serves to protect the display 52/67 and other sensitive components from the elements of weather. The battery and supporting power regulation circuitry 65 is enabled 69 by the user interface's 66 buttons 51, and provides power 68 to the display 52/67, image sensor 60, memory module 61, motion detector 62, distance sensor 63, processor 64, and touchscreen element 52. The aforementioned components are explained as separate entities for a better understanding, but are not necessarily separate physical entities.

Operation

Figure 3:
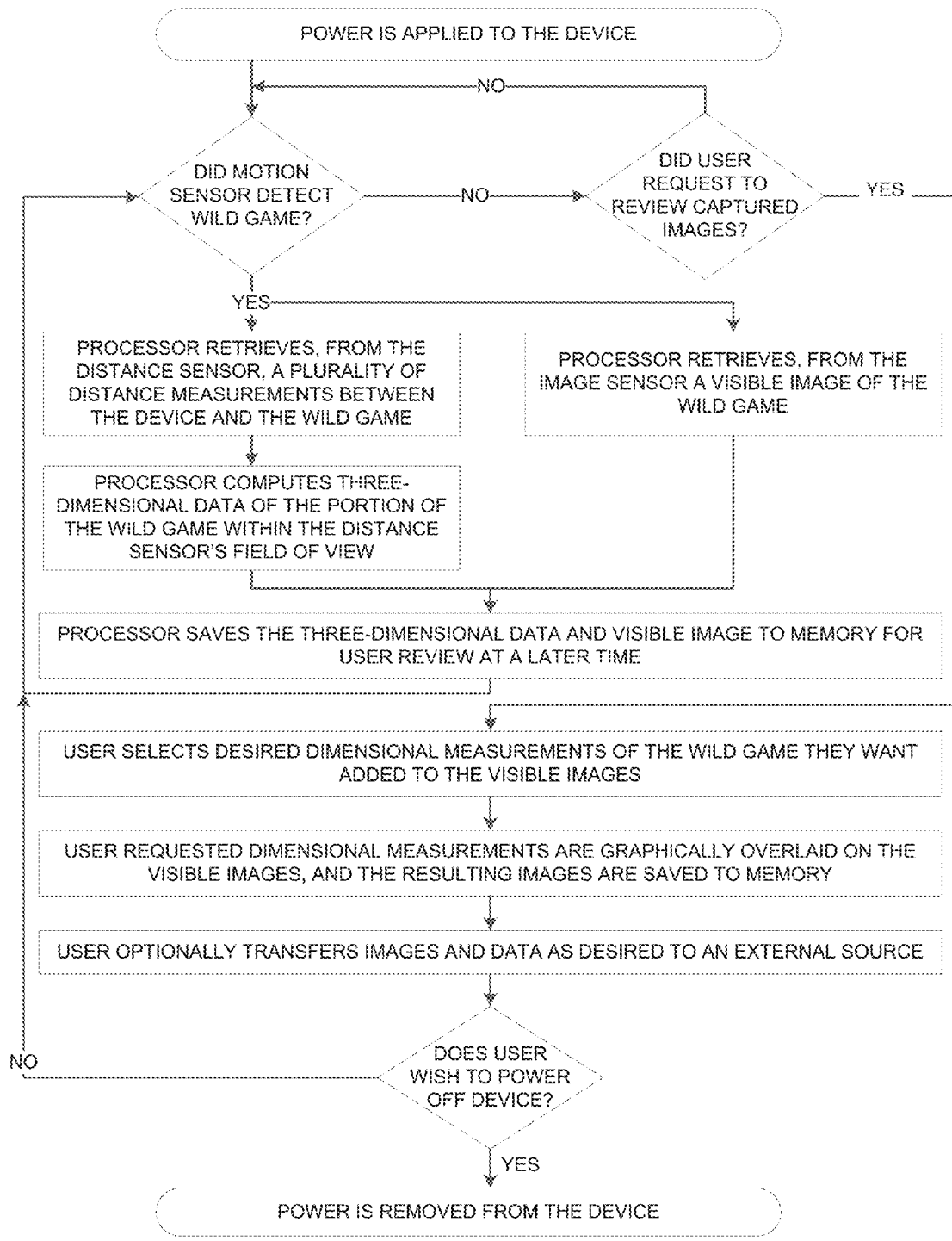
FIG. 3 is a flowchart outlining the process for obtaining three-dimensional data of wild game, and then through the use of that three-dimensional data, displaying dimensional measurements of the wild game to a user.

Operation of the preferred embodiment of the present invention is explained in FIG. 3 and is detailed as follows. A user presses a button 51 applying power 68 to the display 52/67, distance sensor 63, image sensor 60, memory module 61, motion detector 62, processor 64, and touchscreen element 52. The processor 64 then waits upon a trigger 73 from the motion detector 62, which indicates that wild game 54 has entered the image sensor's 60 and distance sensor's 63 field of view. Upon receipt of this trigger 73, the processor 64 sends a trigger 75 to the distance sensor 63 and a trigger 70 to the image sensor 60, retrieving a plurality of distance measurements 74 and visible image data 70 from the distance sensor 63 and the image sensor 60 respectively. Upon receipt of the plurality of distance measurements 74, the processor 64 computes three-dimensional data for each distance measurement.

In the preferred embodiment, each distance measurement is assigned a (x,y,z) coordinate relative to the orientation of the game sizing camera. For example, the x-axis would be parallel to the horizontal tilt of the game sizing camera, the y-axis would be parallel to the vertical tilt of the game sizing camera, and the z axis would be perpendicular to the plane created by the intersection of the x and y axes. There are a number of ways to compute the three dimensional data of wild game 54; in the preferred embodiment, the assumption is made that the plurality of distance measurements 74 all originate from a single point, and predetermined angles between each distance measurement are used to trigonometrically compute the (x,y,z) coordinates. For example, the distance measurement two pixels left of the center pixel would have a predetermined angle between itself and the z-axis, and the x coordinate of this distance measurement would be computed as the product of the distance measurement and the sine of the aforementioned predetermined angle. Similarly, the x, y, and z coordinates would be computed for the entire plurality of distance measurements 74. The predetermined angles are computed as follows. The game sizing camera is placed perpendicular to a known-flat wall at a known distance away from the wall. The wall has a grid with known spacing between each point. The spacing between distance measurements can be measured with the grid, and inverse trigonometric relations can be used to compute the aforementioned predetermined angles.

Once three-dimensional data has been computed, the processor 64 saves the three-dimensional data and the visible image data 70 to the memory module 61 for user review at a later time. Then, upon a request 76 from a user, this processed data 72 is retrieved back from the memory module 61, and a processed image 77 is shown on the display 52/67. Now, the user can select dimensional measurements 53 they wish to have overlaid on the visible image data 70. Various types of dimensional measurements 53 are made simple by the previous step of assigning (x,y,z) coordinates to each distance measurement. For example, measuring the spread of a deer antler is as simple as computing the three-dimensional distance formula between one point on an antler and another. Once desired dimensional measurements 53 have been overlaid on the visible image data 70, the resulting images can be saved back to the memory module 61, and transferred to an external source as desired.

At this point, the user can either push a button 51 removing power 68 from the game sizing camera, or the game sizing camera will again begin waiting for the motion detector 62 to the detect the presence of wild game 54 and start the process over again.

Conclusions, Ramifications, and Scope

Accordingly, the reader will see that the present invention provides users with a much more useful game camera. Users will no longer have to estimate the size of the wild game 54 captured with their game cameras, but rather can make use of accurate three-dimensional data to make direct dimensional measurements 53 of wild game 54.

While the above description contains many specificities, these should not be construed as limitations on the scope of any embodiment, but as exemplifications of the presently preferred embodiments thereof. Many other ramifications and variations are possible within the teachings of the various embodiments. For example, the game sizing camera may not even have a display 52/67. Many existing game cameras do not have displays; it is just the preference of the preferred embodiment to include a display 52/67. Furthermore, the overlay of the dimensional measurements 53 need not occur on the display 52/67 or within the game sizing camera. These dimensional measurements 53 could be overlaid on an external device such as a computer. The game sizing camera does not even need a motion detector 62 for the detection of wild game 54; many game cameras only take pictures at regular intervals hoping to capture the presence of wild game 54. Furthermore, the means of detecting wild game could be through various sensing methods; it is just the preference of the preferred embodiment to use a motion detector 62. The distance sensor 63 could be any kind of scanning or non-scanning distance sensor. Viable methods for a distance sensing unit could be through the use of stereo triangulation, sheet of light triangulation, time-of-flight camera, LIDAR, structured light 3D scanner, interferometry, or many other distance sensing methodologies. The distance sensor 63 could be any device that measures distance from one point to the next. The image sensor 60, motion detector 62, and the distance sensor 63 functions can actually all be performed by one time of flight camera. In passive mode, the time of flight camera can be configured as a motion detector 62; in intensity mode, the time of flight camera can be configured as a grayscale image sensor 60; and in active depth mode, the time of flight camera can be configured as a distance sensor 63. This greatly simplifies the game sizing camera reducing the component count and associated costs thereof. Utilizing the game sizing camera in this mode would also eliminate the need for a separate image sensor 60; it is just the preference of the preferred embodiment to include a separate imaging sensor 60, as most current time of flight sensors can only produce grayscale images. The processor 64 can be any circuit which performs the required computations. This circuit could be built around a micro-controller, FPGA, or many other components. The memory module 61 need not be removable or necessary beyond what is required by the processor 64. Many existing game cameras transmit images on a wireless network for user review without the use of a removable memory module 61; it is just the preference of the preferred embodiment to include a removable memory module 61. The user interface 66 could be any combination of buttons, switches, dials, keys, touchscreens, or any other means through which a user communicates to the present invention. The housing 55 need not be rectangular or plastic. The housing 55 could come in any shape, size, or material. The power unit 65 could be any device through which power is applied to the components of the present invention.

Thus the scope of the invention should be determined by the appended claims and their legal equivalents, and not by the examples given.

The invention claimed is:

1. A device for providing three-dimensional data of wild game, comprising:

a. a processor configured for construction of said three-dimensional data given a plurality of distance measurements between said device and said wild game, and b. a distance sensor for providing said plurality of distance measurements to said processor;

whereby dimensional measurements of the said wild game can be made using said three-dimensional data.

2. The device of claim 1 further comprising a wild game detection sensor for the detection of said wild game; whereby the said distance sensor waits upon said detection of said wild game prior to measuring said plurality of distances.

3. The device of claim 2 wherein the said wild game detection sensor is a motion detector.

4. The device of claim 2 further comprising an imaging sensor for capturing visible images of said wild game; whereby said dimensional measurements of the said wild game can be overlaid on the said visible images.

5. The device of claim 4 wherein the functions of the said wild game detection sensor, the said imaging sensor, and the said distance sensor are all performed by a single time-of-flight camera.

6. The device of claim 4 further comprising a memory storage element for storing said visible images, said three-dimensional data, and said dimensional measurements; whereby said visible images, said three-dimensional data, and said dimensional measurements can be transferred to an external source.

7. The device of claim 6 further comprising a display for the presentation of said visible images and said dimensional measurements; whereby a user can specify said dimensional measurements to be said overlaid on said visible images.

8. A method of providing three-dimensional data of wild game, comprising:

a. providing a distance sensor which is able to measure a plurality of distances;

b. measuring, with said distance sensor, a plurality of distances between said distance sensor and said wild game; and c. providing a processor which will compute said three-dimensional data of said wild game given said plurality of distances, whereby dimensional measurements of the said wild game can be made using said three-dimensional data, further comprising a step for detection of said wild game, with a provided wild game detection sensor, prior to said measuring of said plurality of distances, whereby said distance sensor waits upon said detection of said wild game prior to said measuring of said plurality of distances; and further comprising a step for capturing a visible image of said wild game, using an imaging sensor, after said detection of said wild game; whereby said dimensional measurements of the said wild game can be overlaid on the said visible image; and further comprising a step for storing said visible image, said three-dimensional data, and said dimensional measurements into a provided memory storage element, after the creation of said visible image, said three-dimensional data, and said dimensional measurements; whereby said visible image, said three-dimensional data, and said dimensional measurements can be transferred to an external source.

9. The method of claim 8 wherein the functions of the said wild game detection sensor, the said imaging sensor, and the said distance sensor are all performed by a single time-of-flight camera.

10. The method of claim 8 wherein said visible image, said three-dimensional data, and said dimensional measurements can be manipulated by the said external source.

11. The method of claim 8 further comprising a step for the presentation of the said visible image and said dimensional measurements on a provided display; whereby a user can specify said dimensional measurements to be said overlaid on the said visible image.

* * * * *